United States Patent
Sterne et al.

(10) Patent No.: US 6,226,262 B1
(45) Date of Patent: May 1, 2001

(54) CORRECTION OF CALENDAR BASED ATM CELL SCHEDULING FOR DOWNSTREAM CELL INSERTION

(75) Inventors: Jason T. Sterne, Ottawa; Denny L. S. Lee, Kanata; Stanko Vuleta, Ottawa, all of (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 08/878,959

(22) Filed: Jun. 19, 1997

(51) Int. Cl.[7] ................................................ H04L 12/26
(52) U.S. Cl. ................................. 370/231; 370/236
(58) Field of Search ................................. 370/229, 230, 370/231, 232, 233, 234, 235, 236, 237, 238, 239, 240, 412, 395, 468

(56) References Cited

U.S. PATENT DOCUMENTS

| | | | |
|---|---|---|---|
| 5,535,201 | * | 7/1996 | Zheng ................................. 370/60.1 |
| 5,602,830 | * | 2/1997 | Fichou et al. ...................... 370/232 |
| 5,764,626 | * | 6/1998 | VanDervort ........................ 370/232 |
| 5,831,971 | * | 11/1998 | Bonomi et al. ..................... 370/230 |
| 5,835,494 | * | 11/1998 | Hughes et al. ..................... 370/397 |
| 5,864,540 | * | 1/1999 | Bonomi et al. ..................... 370/235 |
| 5,946,297 | * | 8/1999 | Calvignac et al. ................. 370/230 |

FOREIGN PATENT DOCUMENTS

| | | | |
|---|---|---|---|
| 0 669 777 A1 | 8/1995 | (EP) | ............................ H04Q/11/04 |
| WO97/10653 | 3/1997 | (WO) | .............................. H04J/3/16 |

* cited by examiner

Primary Examiner—Chau Nguyen
Assistant Examiner—D. Trinh
(74) Attorney, Agent, or Firm—Marks & Clerk

(57) ABSTRACT

A calendar based ATM cell scheduling device is used to maintain accurate shaping of cell streams in order to satisfy traffic management guarantees. In certain applications cell insertion may occur downstream of the scheduling device, potentially violating traffic descriptors. The correction means provided by the present invention allows for such downstream cell insertion without violating guarantees by generating a calendar slip in the scheduling device.

17 Claims, 2 Drawing Sheets

CORRECTION OF CALENDAR BASED ATM CELL SCHEDULING FOR DOWNSTREAM CELL INSERTION

FIELD OF THE INVENTION

This invention relates to asynchronous transfer mode (ATM) technology and more particularly to an ATM telecommunications system having a traffic shaping entity to maintain accurate scheduling in the event of a cell insertion into the traffic stream by a downstream device.

BACKGROUND OF THE INVENTION

The use of telecommunications equipment for both personal and enterprise requirements has been dramatically increasing for the past number of years. With this increased use comes the demand for greater efficiency and higher bandwidths. Asynchronous transfer mode (ATM) technology is being seen as the solution of choice to meet these demands. One of the key attributes of ATM technology is its ability to efficiently carry many types of information traffic such as data, voice and video and to provide a variety of qualities of service (QoS) for network applications.

An issue of great importance to users and developers of ATM switches is how to manage the traffic in an efficient manner in order to gain a high degree of bandwidth utilization on a wide area network. The ATM Forum sets out numerous criteria with respect to the nature and requirements of traffic management in ATM systems. Included in these criteria are several traffic descriptors which are basically a set of parameters used to capture the intrinsic characteristics of particular streams of network data. These standard traffic descriptors allow an ATM switch to use statistical models based on the traffic descriptors to efficiently allocate resources (bandwidth, buffers) amongst the various streams of traffic.

Because the allocation of resources in an ATM network is based on some basic parameters that characterize traffic streams, it is important that the traffic streams behave as closely as possible to those traffic descriptor parameters. The more closely the traffic streams adhere to the traffic descriptors, the more accurate the allocation of network resources will be. If the allocation of network resource is very accurate then the usage of these resources will be very efficient while maintaining the required qualities of service for all traffic.

One method of insuring that ATM traffic streams conform to the negotiated traffic contract is to police the data with a usage parameter control (UPC) algorithm. A more desirable method of assuring traffic conformance is to employ traffic shaping. Traffic shaping takes a stream of data and reshapes its attributes so that it conforms to the traffic descriptor. Shaping allows a slightly nonconforming stream to become conforming with no cell loss.

When traffic shaping is employed in a network it is important that the traffic be shaped accurately to conform as closely as possible to the parameters of the traffic contract. A problem can arise when a cell can be inserted into a traffic stream at a point that is downstream from a traffic shaping entity. This cell insertion can cause several problems including violation of the strict traffic descriptor parameters or an instantaneous and unrecoverable increase in cell transfer delay (CTD) for every traffic stream serviced by the shaper. The actual problem encountered depends on the specific details of implementation of the cell insertion and shaping devices.

SUMMARY OF THE INVENTION

It is an object of the present invention to provide a traffic shaping entity having both the means and the method of maintaining accurate shaping for close conformance to the traffic descriptor and minimal introduction of CTD even in the face of a cell insertion into a traffic stream by a downstream device.

Therefore, in accordance with a first aspect of the present invention there is provided in an ATM communication system having a calendar scheduling device for shaping cell traffic flow in accordance with defined parameters, wherein the system has means to insert cells downstream of the scheduling device, the improvement comprising correction means to maintain cell traffic flow in accordance with defined parameters in the event of a cell insertion downstream of the scheduling device. The correction means has means to detect an occurrence of a downstream insertion; feedback means to signal the occurrence of a downstream cell insertion to the scheduling device; and means in the scheduling device to generate a calendar slip.

In accordance with a second aspect of the present invention there is provided in an ATM telecommunication system having a calendar scheduling device for shaping cell traffic flow in accordance with defined parameters, the system having means to insert cells downstream of the scheduling device, a method of correcting the cell flow traffic in the event of a cell insertion downstream of the scheduling device. The method comprises: detecting the occurrence of a cell insertion downstream scheduling device, providing a feedback signal representing a downstream cell insertion to the scheduling device, and causing the scheduling device to generate a calendar slip.

BRIEF DESCRIPTION OF THE DRAWINGS

The invention will now be described in greater detail with reference to the attached drawings wherein.

DETAILED DESCRIPTION OF THE INVENTION

Figure 1:
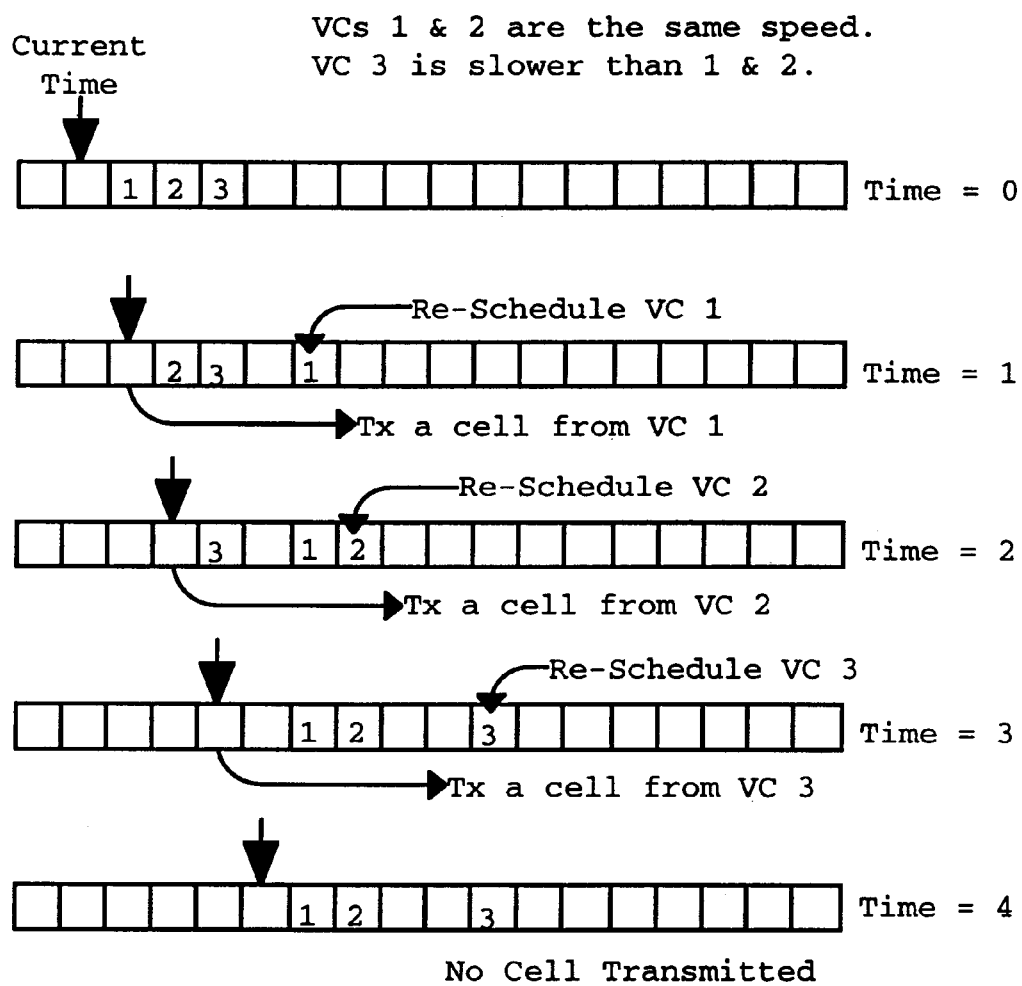
FIG. 1 illustrates a simple calendar operation for connection scheduling.

The operation of calendar scheduling will now be described with reference to FIG. 1. Calendar scheduling is used in ATM applications to determine when to transmit a cell from a given connection. This scheduling is directly applicable to a shaping function. Time is generally referenced in cell times, where one cell time is the time from which the first bit of one cell passes a reference point until the time when the first bit of the next cell passes the same reference point. As an example, one cell time in an OC3 link operating at 149.76 Mb/s is about 2.83 us. As the current time, which is shown by the arrow in FIG. 1, moves forward it will pass a connection's scheduled transmit time. In the present invention, the current time is based on a time reference such as an internal clock or is taken from the data stream. As shown in FIG. 1 the calendar includes virtual connections (VC) 1, 2 and 3 positioned in cell slots. In FIG. 1, VCs 1 and 2 are the same speed while VC 3 is slower than VCs 1 and 2. At time t=0, VCs 1, 2 and 3 are located in successive cell slots. At time t=1, a cell from virtual channel 1 is transmitted and channel 1 is rescheduled as illustrated. At time t=2, a cell is transmitted from virtual channel 2 and VC 2 is rescheduled immediately after VC 1. At time t=3, a cell from virtual channel 3 is transmitted and rescheduled in the calendar. As VC 3 is slower than VCs 1 and 2, VC 3 is placed in the calendar with gaps or holes between VC 3 and VC 2. At time t=4, as there is no connection in the next calendar slot, no cells are transmitted.

A concept that is important to the understanding of the present invention is what is referred to as a calendar slip. A calendar slip occurs when the current time is stepped forward but no cells are allowed to be transmitted at that particular time due to a cell insertion or the transmission of some higher priority cells.

A calendar slip when there was no cell to be transmitted anyway as in time t=4 in FIG. 1 has no effect. However, when a calendar slip occurs at a point in time when a connection should have been serviced, then all scheduled connections have to be rescheduled at one time slot later. This rescheduling only needs to occur down the calendar until a hole or gap is encountered.

Figure 2:
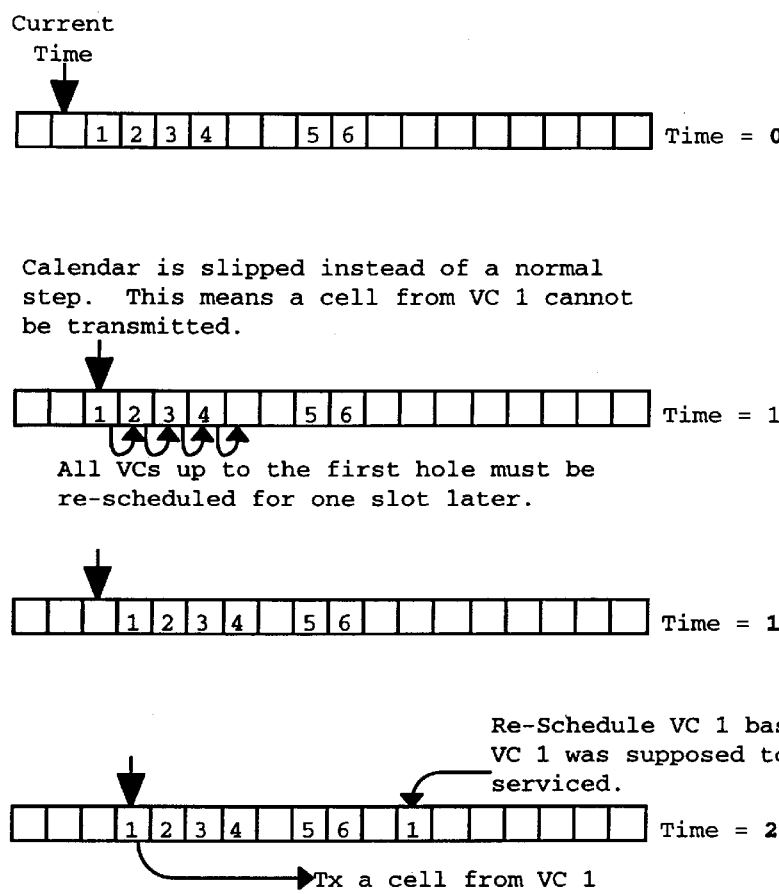
FIG. 2 illustrates an example of a calendar slip.

It is the aforementioned calendar slip that is used to correct for downstream cell insertions in the present invention. The actual implementation of a calendar slip may vary but the result will be the same. Every connection until a hole or gap is found must be rescheduled to one slot later. This is shown in FIG. 2. As in the previous figure, the current time is illustrated by the vertical arrow. The calendar for time t=0, includes six virtual connections with virtual connections 1 through 4 appearing in sequential slots followed by two holes or gaps followed by virtual connections 5 and 6. The concept of a calendar slip is illustrated in the uppermost calendar for time t=1. The calendar slip means that a cell from virtual channel 1 is not transmitted but rather all of the virtual connections up to the first hole are rescheduled for one time slot later. Thus, as shown in the third calendar from the top also at time t=1, one of the holes or gaps has been filled. At time t=2, a cell from virtual connection 1 is transmitted and virtual channel 1 is rescheduled based on when VC 1 was supposed to have been serviced. Thus, each connection must remember the time when it was supposed to have been serviced, this time is called the theoretical service time (TST). This TST can be used when a connection is serviced and needs to be rescheduled. The rescheduling will occur based on the TST rather than the actual time that a connection was serviced and thus a connection can recover from a slip.

Figure 3:
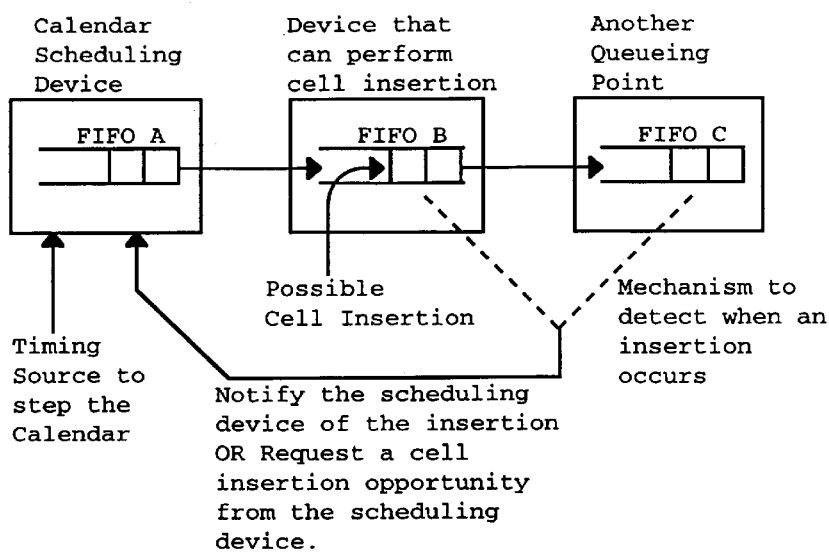
FIG. 3 represents a typical functional layout for ATM cell processing.

FIG. 3 is used to illustrate the scheduling correction mechanism according to the present invention. FIG. 3 is a typical functional layout for ATM cell processing. It is to be understood that the devices may all be integrated or they may be separate. As shown in FIG. 3 FIFO A represents the calendar scheduling device which has its own timing source to step the calendar. FIFO B represents a device that can perform cell insertion such as an OAM cell. It is to be understood, however, that the invention is not restricted to applications that insert only OAM cells. FIFO C represents another queuing point which includes a mechanism to detect when a cell insertion occurs.

The calendar scheduling device will sometimes create a burst of back-to-back cell traffic. During this burst each of the three (this number may be less or more depending on the number of FIFO stages used in a specific implementation) FIFO's will be in a steady state where one cell will arrive for each cell sent on to the next FIFO. Whenever the scheduling process results in some holes or gaps (i.e. no cells to send during some cell times), then the FIFOs will begin to drain.

Where there is a device that can perform cell insertion such as FIFO B in FIG. 3 downstream from the scheduling device, then a problem can occur when a cell insertion occurs, or is requested, during a period when the scheduling device is transmitting a burst of back-to-back cells. There is simply no room in the cell stream for the insertion. If an insertion occurs the FIFOs will fail further and additional insertions could cause the FIFOs to overflow resulting in cell loss.

One possible solution to this problem would be to simply not step the calendar once in order to leave a space for the inserted cell. However, this method means that the timing reference will be lost and would introduce an instantaneous and unrecoverable increase in cell transfer delay (CTD) since every subsequent cell transmitted by the scheduler will now be one cell time late. In fact, each insertion will cause accumulative CTD which results in a perceived loss of bandwidth for each and every connection.

According to the invention, the calendar scheduling device generates a calendar slip when it is notified of, or detects itself, a downstream cell insertion. When the calendar is slipped, the timing reference is not lost because the current time still moves forward correctly. Slipping the calendar means that CTD will be introduced but only for each scheduled connection until there is a hole or gap in the calendar. The CTD is recoverable on the connection because the connections can be rescheduled based on the time that they should have been serviced.

While a particular embodiment of the invention has been described and illustrated it will be apparent to one skilled in the art to which the invention pertains that many alternatives and variations can be effected. It is to be understood that such alternatives and variations are assumed, to the extent possible, to fall within the scope of the invention as defined by the appended claims.

What is claimed is:

1. In an ATM telecommunications system having a calendar scheduling device for shaping cell traffic flow respecting virtual connections in accordance with defined parameters, the system having timing means to provide a current time, means to retain a theoretical service time (TST) for each virtual connection and means to insert cells downstream of the scheduling device, the system further comprising; means to detect an occurrence of a downstream cell insertion and means to generate, in response to the occurrence of a downstream cell insertion a calendar slip whereby said current time is advanced and no cells are transmitted.

2. The system as defined in claim 1 wherein said calendar scheduling device includes a first, first-in first-out (FIFO) buffer having cell slots for temporarily storing cell traffic destined for identified virtual connections.

3. The system as defined in claim 2 wherein said means to insert cells downstream of the scheduling device includes a second FIFO buffer.

4. The system as defined in claim 3 wherein said means to detect an occurrence of a downstream cell insertion comprises a third FIFO buffer having means to monitor cell traffic therethrough.

5. The system as defined in claim 4 wherein said feedback means to signal the occurrence of a downstream cell insertion to the scheduling device also includes means to request a cell insertion opportunity from said scheduling device.

6. The system as defined in claim 5 wherein said cells inserted downstream of said calendar scheduling means are operations, administration and maintenance (OAM) cells.

7. A system as defined in claim 1 wherein said means to generate a calendar slip is a feedback means.

8. A system as defined in claim 1 wherein said means to detect an occurrence of a downstream cell insertion includes correction means.

9. The system as defined in claim 1 wherein said virtual connections are rescheduled to transmit cells after a calendar slip has occurred, based on said TST.

10. In an ATM telecommunication system having a calendar scheduling device for shaping cell traffic flow respecting virtual connections in accordance with defined parameters, the system having timing means to provide a current time means to retain a theoretical service time (TST) for each virtual connection and means to insert cells downstream of said scheduling device, a method of correcting the cell flow traffic in the event of a cell insertion downstream of said scheduling device said method comprising: detecting the occurrence of a cell insertion downstream of said scheduling device and generating a calendar slip in response to the occurrence of a downstream cell insertion, wherein said calendar slip advances said current time and no cells are transmitted.

11. A method as defined in claim 10 wherein said downstream cell insertion causes a feedback signal.

12. A method as defined in claim 11 wherein said calendar slip is generated by said scheduling device.

13. The method as defined in claim 10 wherein said virtual connections are rescheduled to transmit cells after a calendar slip has occurred, based on said TST.

14. A traffic shaping system having a calendar scheduling device for shaping cell traffic flow of virtual connections in a digital communications network, in accordance with defined traffic parameters, said system having timing means to provide a current time, storage means to retain a theoretical service time (TST) of each virtual connection and means to insert cells downstream of said calendar scheduling device, said system further comprising: means to detect an occurrence of a downstream cell insertion, and means to generate, in response to the detection of an occurrence of a downstream cell insertion, a calendar slip whereby the current time is advance one cell slot without transmitting a cell and all scheduled connections are rescheduled for service one time slot later.

15. A traffic shaping system as defined in claim 14 wherein rescheduling of connections continue until a gap occurs in said calendar scheduling device and thereafter connections are rescheduled in accordance with said TST.

16. The system as defined in claim 1 wherein said calendar slip includes rescheduling of every virtual connection, until a gap occurs in said calendar, to one time slot later.

17. The method as defined in claim 10 wherein said calendar slip includes rescheduling of every virtual connection, until a gap occurs in said calendar, to one time slot later.

* * * * *